Patented Aug. 26, 1952

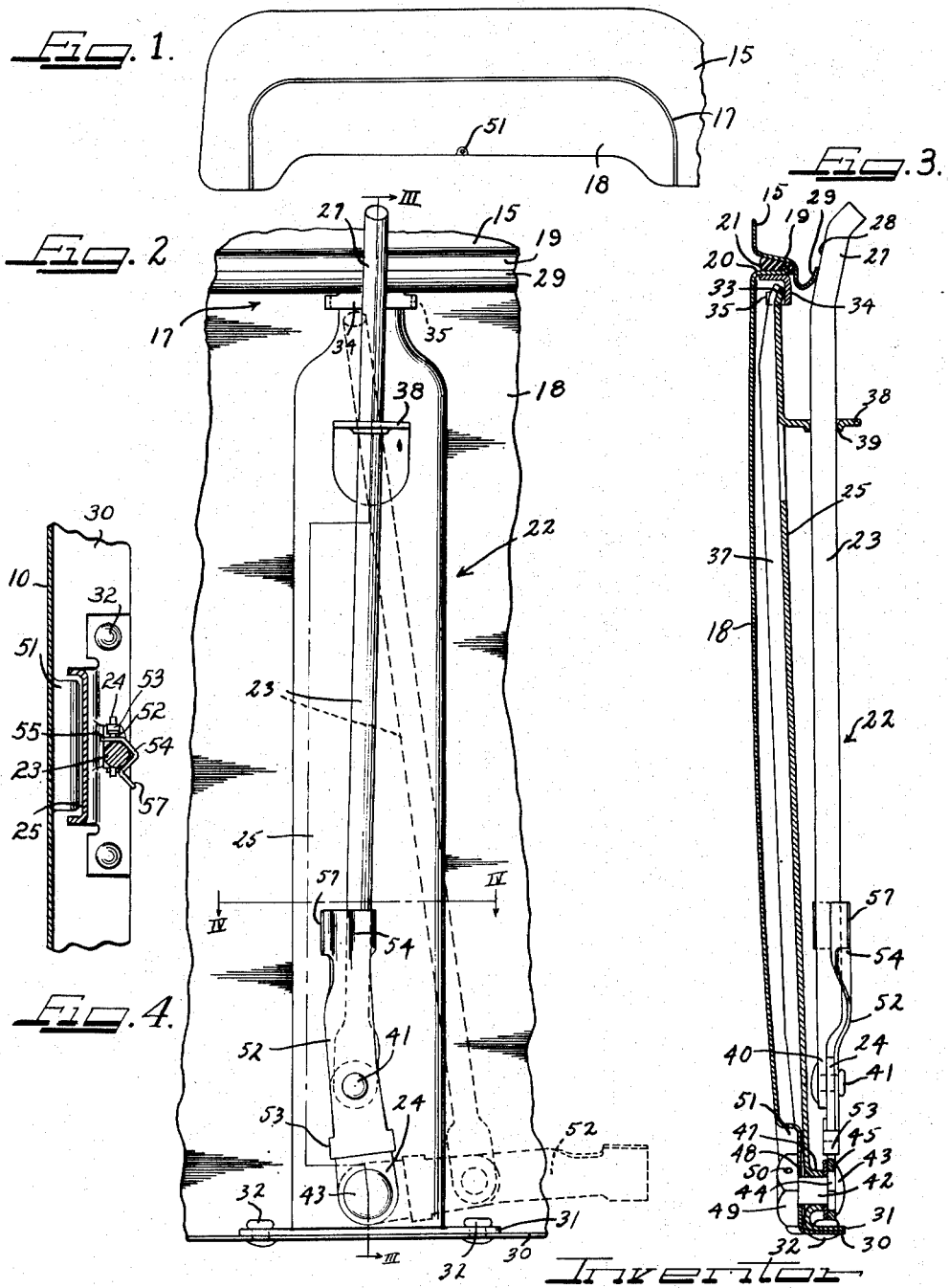

2,608,427

UNITED STATES PATENT OFFICE 2,608,427

FENDER SHIELD LATCHING MECHANISM

George W. Schatzman, Detroit, Mich., assignor to Houdaille-Hershey Corporation, Detroit, Mich., a corporation of Michigan Application September 8, 1947, Serial No. 772,703

4 Claims. (Cl. 292—66)

This invention relates to improvements in fender shields and more particularly concerns novel latching mechanism by which the fender shields are held in place on the fenders with which they are associated.

In the vehicle industry, and particularly in the automobile industry, various means have been utilized to improve the appearance of vehicle fenders. The usual vehicle fender is provided with an opening affording access to the vehicle wheel and permitting ready removal or replacement of the wheel in an axial direction. Since this opening inherently presents an unattractive outward appearance, detachable fender shields have been employed to cover the opening ornamentally.

As the term "fender shield" shall hereinafter be employed, it refers to any of the general type of described members which is adapted to be secured to a fender or other portion of a vehicle body for the purpose of covering the opening in the fender or vehicle body provided for access to or removal of a vehicle wheel. Furthermore, as the term "fender" shall hereinafter be employed, it refers to any form of wheel fender in its broad sense, whether such fender be separated from the vehicle body, partly separated from the vehicle body, or actually an integral part of the vehicle body, and whether or not it projects outwardly from the principal body portion of the vehicle.

An important object of the present invention is to provide a novel means for latching a fender shield in position on a fender.

Another object of the invention is to provide a fender shield having improved latching mechanism.

A further object of the invention is to provide an improved toggle link type fender shield latching mechanism.

Still another object of the invention is to provide improved retaining means for the latching member of a fender shield latching mechanism.

Yet another object of the invention is to provide an improved fender shield latching mechanism which is simple and efficient in operation and involves but a small number of inexpensive, low cost, rugged parts susceptible of economical mass production methods of manufacture and assembly.

Other objects, features and advantages of the present invention will be readily apparent from the following detailed description of certain preferred embodiments thereof taken in conjunction with the accompanying three sheets of drawings, in which:

Figure 1 is a fragmentary outer side elevational view of a fender and fender shield assembly embodying features of the present invention;

Figure 2 is an enlarged fragmentary inside elevational view of the fender and fender shield assembly showing one form of the novel fender shield latching mechanism of the present invention;

Figure 3 is a vertical sectional view taken substantially on the line III—III of Figure 2; and Figure 4 is a horizontal sectional view taken substantially on the line IV—IV of Figure 2.

Having reference to Fig. 1, a fender 15 has a wheel access opening 17 which is normally closed by a fender shield 18, sometimes also referred to as a fender skirt. The fender shield 18 is held in place in the opening 17 by any suitable means located at the ends of the fender shield and interengageable with the fender, or means carried by the fender and interengageable by appropriate means at the ends of the fender shield. Such means is preferably of a character to permit the fender shield to be conveniently mounted on the fender or removed by rocking the same about a horizontal axis extending through the lower portions of the ends of the fender shield. Through this arrangement the fender shield 18 is mounted initially and primarily at its ends, that is, the ends of the fender shield are first placed in association with the fender 15 at the opening 17 and the principal load or weight of the fender shield is sustained by the interconnections effective at the ends of the fender shield. Then, as a final maneuver in mounting the fender shield, it is swung inwardly about the axis of the end connections into full engagement with the fender 15.

Herein the fender and fender shield are so related in the closed condition of the fender shield that the latter lies substantially flush with the outer surface of the fender. For this purpose the fender is provided with a marginal angular inset flange 19 (Fig. 3) providing, in effect, a rabbet about the opening 17 receptive of a marginal inturned flange 20 on the edge of the fender shield 18 and carrying a cushioning gasket 21 which fits within the rabbet groove of the fender reinforcing flange 19. In the final assembly, the gasket 21 is compressed or squeezed between the fender flange 19 and the fender shield flange 20 to maintain a rattle-free relationship between the fender shield and the fender.

In order to maintain the fender shield in the fully assembled relationship with the fender 15, and particularly against swinging open, latching mechanism 22 (Figs. 2 and 3) is provided. This mechanism comprises as the principal working parts a latch rod 23 arranged to be actuated by a toggle link 24. The rod 23 is supported reciprocably and rockably by a supporting and guiding strut 25.

The latch rod 23 is approximately the same length as the width of the fender shield 18 and extends vertically at approximately the rear center of the fender shield. At its upper end the latch rod is formed with a slightly inturned cam head 27 having a cam surface 28 engageable in latching condition with the fender flange 19, the latter in the present instance having an upturned inner marginal flange 29 against which the cam surface 28 of the latch rod engages. The construction and arrangement are such that in such engagement the upper margin of the fender shield 18 is drawn toward the fender flange 19 and the gasket 21 is thereby placed under compression whereby the fender shield is held snugly and rattle-free.

The strut 25 is preferably formed from sheet metal and is of a length to extend from substantially the upper marginal reinforcing flange 20 of the fender shield to a lower inturned marginal reinforcing flange 30 on the fender shield. An inturned foot flange 31 on the strut is secured as by means of rivets 32 upon the lower marginal flange 30. The upper end of the strut has an inturned terminal flange 33 which is in engagement with a bracket 34 secured to the under face of the upper marginal reinforcing flange 20 as by means of welding or the like and extending downwardly inwardly of the terminal flange 33. Thereby the terminal flange 33 is operatively connected to the margin of the fender shield. Side flanges 35 on the bracket 34 hold the upper end of the strut 25 against any possible lateral displacement. Longitudinal side flanges 37 on the strut afford reinforcement.

Adjacent to its upper end, the strut 25 has an inturned integrally struck-out horizontal bearing eye 38 which has a central bearing aperture defined by a downturned annular bearing flange 39 through which the latch rod 23 extends slidably reciprocably and with ample play to permit rocking thereof in operation.

The lower end of the latch rod 23 is flattened to provide an integral attachment ear 40 to which the upper end of the toggle link 24 is pivotally secured as by means of a rivet 41. The lower end of the link 24 is pivotally carried by a pin or stud bolt 42 which is adapted to be turned to swing the link 24 for moving the latch rod 23 from the latching to non-latching position or back to latching position, the full latching position being shown in Figs. 2 and 3 in full lines, and the non-latching position being shown in dash outline in Fig. 2.

The toggle link bolt 42 is oscillatably supported adjacent the lower edge of the fender shield 18 and is adapted to be manipulated from the outer side of the fender shield for actuating the toggle link 24 and thereby the latch rod 23. To this end, the bolt 42 includes a head 43 with a square shoulder 44 immediately adjacent the head fitting within a square eye 45 provided in the lower portion of the link 24. The shank of the bolt 42 extends through an annular bearing flange 47 upset from the lower end portion of the strut 25, with the outer end portion of the shank projecting through an aperture 48 in the fender shield. A nut such as a hexagonal nut 49 is secured to the extremity of the bolt shank as by means of a cross pin 50.

In order to avoid undue protrusion of the nut 49 beyond the outer face of the fender shield 18, the latter is preferably provided with an inset embossment 51 affording ample clearance for reception of the socket of a wrench for engaging the nut 49 to turn the bolt 42 as required. The wrench (not shown) may be an ordinary wheel wrench such as is used for removing or replacing the wheel of a vehicle such as an automobile with which the fender shield is adapted to be used.

In order to maintain the latch rod 23 and the toggle link 24 in latching relationship from which they normally tend to move, means such as a combination spring catch and keeper member 52 is provided. In a preferred form the member 52 comprises a strip of spring metal such as spring steel which is secured to the link 24 by means of the rivet 41 and is held against rotation relative to the link by means of side arms 53 adjacent the lower end of the strip embracing the sides of the link. The upper end portion of the keeper and catch member 52 extends substantially beyond the upper end of the link 24 and is formed with a spring cradle 54 (Figs. 3 and 4) which is formed to engage yieldably with the rod 23 and has a stop arm 55 at one side and a cam flange 57 at the other side. The spring cradle 54 is formed slightly eccentric toward the stop arm side thereof relative to the longitudinal axis of the link 24. As a result, when the spring cradle 54 is in engagement with the latch rod 23, the pivot 41 is over center, and this combined with the resilient cradling engagement of the rod and the positive retention afforded by the stop arm 55 effectively holds the latch rod 23 against displacement from latching position.

To move the latch arm to non-latching position, the bolt 42 is turned by application of a wrench to the nut 49 in a rotary direction to carry the spring cardle 54 out of engagement with the rod 23, by camming and flexing past the rod toward the cam flange side 57 of the spring cradle, thus releasing the catch and keeper member 52 from the latch arm. Thereupon further swinging movement in the same direction of the link 24 causes the latch arm to be drawn downwardly and swung laterally to the non-latching position as shown in dash outline in Fig. 2. Relatching is effected by turning the bolt 42 in the opposite direction until the cam flange 57 of the keeper catch device snaps yieldably past the latch rod 23 and the latch rod is engaged in the spring cradle 54.

It will, of course, be understood that various details of construction may be varied through a wide range without departing from the principles of this invention, and it is, therefore, not the purpose to limit the patent granted hereon otherwise than necessitated by the scope of the appended claims.

I claim as my invention:

1. In combination in a fender shield latching mechanism, a supporting and guiding structure arranged to be carried by the inner side of a fender shield, a latch rod reciprocably and rockably guided by said structure, a link rotatably supported by said structure and having a pivotal connection with said rod, a wrench-engageable rotatable member arranged for access at the outer side of the fender shield on the pivotal axis of said link for swingably manipulating the link to actuate said rod, and a releasable spring catch device for holding the link and rod assembly in the latching position, said catch device comprising a spring clip carried by the link and engageable with the latch rod.

2. In combination in a fender shield latching mechanism, a reciprocable and swingable latch rod, a link connected to the rod, means for actuating said link, and a yieldable catch member carried by the link and engageable with the latch rod in the latching position thereof for holding the latch rod against unintentional displacement from the latching position.

3. In combination in a fender shield latching mechanism, a reciprocable and swingable latch rod, a link connected to the rod, means for actuating said link, and a yieldable catch member carried by the link and engageable with the latch rod in the latching position thereof for holding the latch rod against unintentional displacement from the latching position, said catch member including a catch cradle engaging the latch rod and having a stop arm at one side and a cam flange at the other side.

4. In combination in a fender shield latching mechanism, supporting structure, a reciprocable and rockable elongated latching member having a latching head structure at one end, a link connected to the opposite end of said member and swingable in an arc to carry said latching member into and out of latching position, and a combination spring catch and keeper device including a spring arm carried by the link and projecting beyond the end thereof which is pivated to the latch member for engaging the latch member in an over-center latching position of the link and the latch member for retaining the latch member against unintentional displacement from the latching position.

GEORGE W. SCHATZMAN.

REFERENCES CITED

The following references are of record in the file of this patent:

UNITED STATES PATENTS

| Number | Name | Date |
| --- | --- | --- |
| 887,591 | Cook | May 12, 1908 |
| 1,929,341 | Wagner | Oct. 3, 1933 |
| 2,068,732 | Cadwallader | Jan. 26, 1937 |
| 2,226,857 | Fergueson | Dec. 31, 1940 |
| 2,302,415 | Buchanan | Nov. 17, 1942 |
| 2,349,466 | Schueren | May 23, 1944 |
| 2,530,402 | Schatzman | Nov. 21, 1950 |